United States Patent [19]
Staser et al.

[11] Patent Number: 5,535,553
[45] Date of Patent: Jul. 16, 1996

[54] SUPERPLUG VEHICLE DOOR MODULE

[75] Inventors: Brian H. Staser, Troy; Danny W. Figlioli; Daniel H. Forrest, both of Macomb Township, all of Mich.

[73] Assignee: General Motors Corporation, Detroit, Mich.

[21] Appl. No.: 340,761

[22] Filed: Nov. 16, 1994

[51] Int. Cl.⁶ ....................................................... B60J 5/04
[52] U.S. Cl. .................................................. 49/502; 49/348
[58] Field of Search ........................... 49/502, 503, 352, 49/349, 348, 350, 351

[56] References Cited

U.S. PATENT DOCUMENTS

| | | | |
|---|---|---|---|
| 2,650,857 | 9/1953 | Watter et al. | 296/44 |
| 3,782,036 | 1/1974 | Clark et al. | 49/502 |
| 3,888,047 | 6/1975 | Chikaraishi | 49/351 |
| 4,428,157 | 1/1984 | Engelsberger et al. | 49/502 |
| 4,648,208 | 3/1987 | Baldamus et al. | 49/502 |
| 4,702,040 | 10/1987 | Hellriegel | 49/502 |
| 4,769,951 | 9/1988 | Kaaden | 49/502 |
| 4,785,585 | 11/1988 | Grier et al. | 49/502 |
| 4,831,710 | 5/1989 | Katoh et al. | 49/434 |
| 4,876,825 | 10/1989 | Widrig et al. | 49/502 |
| 4,882,842 | 11/1989 | Basson et al. | 29/857 |
| 4,924,630 | 5/1990 | Lomasney et al. | 49/502 |
| 4,937,977 | 7/1990 | Gergoe et al. | 49/352 |
| 4,974,365 | 12/1990 | Ono | 49/502 |
| 5,033,236 | 7/1991 | Szerdahelyi et al. | 49/502 |
| 5,040,334 | 8/1991 | Dossin et al. | 49/502 |
| 5,040,335 | 8/1991 | Grimes | 49/502 |
| 5,067,281 | 11/1991 | Dupuy | 49/502 |
| 5,111,620 | 5/1992 | Lau et al. | 49/502 |
| 5,195,211 | 3/1993 | Krajenke | 49/351 X |
| 5,251,403 | 10/1993 | Compeau et al. | 49/352 |
| 5,308,138 | 5/1994 | Hlavaty | 49/502 X |

FOREIGN PATENT DOCUMENTS

| | | |
|---|---|---|
| 0286923 | 10/1988 | European Pat. Off. . |
| 2416809 | 7/1979 | France . |
| 2177329 | 3/1982 | United Kingdom . |

Primary Examiner—Philip C. Kannan
Attorney, Agent, or Firm—Jeffrey A. Sedlar

[57] ABSTRACT

A door module including a one-piece plastic frame having a network of integrally molded structural elements and hardware mounting surfaces is provided that features easily accessible snap-fit serviceable components integrated into an efficient modular form.

11 Claims, 5 Drawing Sheets

SUPERPLUG VEHICLE DOOR MODULE

BACKGROUND OF THE INVENTION

The present invention relates to vehicle doors.

Conventional vehicles employ side door assemblies having openable windows requiring operating hardware which is known as the window regulator. The window and regulator generally occupy a large part of the limited space available within the door assembly. Additional hardware items also conventionally reside in a vehicle door and therefore, must be assembled into the door assembly with the window and regulator in a coordinated manner to avoid interference.

In such door assemblies the window, at its fore and aft sides adjacent its bottom edge, is generally slidably guided for movement through a pair of stationary guides or guide channels mounted within the door assembly. The guide channels engage the window as it moves between a fully open position, in which it is substantially disposed within the door assembly and a fully closed position, in which the majority of the window is located above the belt line of the door assembly.

The window is generally moved between its open and closed positions by a suitable window regulator mechanism. A commonly known type of window regulator is the cross-arm window regulator. This common window regulator is operatively connected to a sash channel which is mounted to the bottom edge of the window, thereby permitting the window regulator to effect raising and lowering movement of the window. The window regulator mechanism is typically manually or power operated.

A typical door system also includes interior and exterior handles and a door latch for releasably holding the door in a closed position. Both interior and exterior handles are linked to the latch mechanism to effect operation thereof. Interior and exterior lock actuators are also typically provided in the door system which are operatively linked to the latch or handles to selectively prevent the handles from releasing the latch assembly to an open position.

The art has adapted many of the conventional door system hardware components for mounting in an integrated modular assembly. The base for the module is typically comprised of metal or plastic and is designed to provide adequate support for the various hardware components.

In providing operable door assemblies, quality, reliability and costs are ever present concerns. Therefore, a continuous need exists to provide features that address these concerns for the various hardware components operating within a vehicle's door system.

SUMMARY OF THE INVENTION

The present invention provides a door module with a base mounting frame for vehicle door hardware. The frame includes a network of integrally molded structural elements and hardware mounting surfaces with various interfacing features, molded in a single plastic piece.

The integration of several components that feature easily accessible, snap-fit, serviceable characteristics into a modular unit facilitates installation of the components into a vehicle door thereby providing assembly efficiency. By assembling the several hardware components onto the frame prior to installation in the door, the ability to pre-test component operation is provided. In addition, hardware interfacing features designed for serviceability, assembly and improved dimensional control are provided.

The module generally includes a one-piece molded plastic frame constructed with preferred hollow tubular structural elements, integrally molded hardware mounting surfaces and preferably integrates at least one window guide channel into the structure. Specifically designed features are preferably molded into the frame for mounting various hardware items and for geometric dimensioning and tolerancing purposes.

Specific features to inhibit unauthorized actuation of the locking system and to deflect water away from critical components are also preferably integrated into the frame. A facility for manually grasping and manipulating the frame and interior trim attachment features are also preferably molded into the design.

DETAILED DESCRIPTION OF THE PRESENTLY PREFERRED EMBODIMENT

Figure 1:
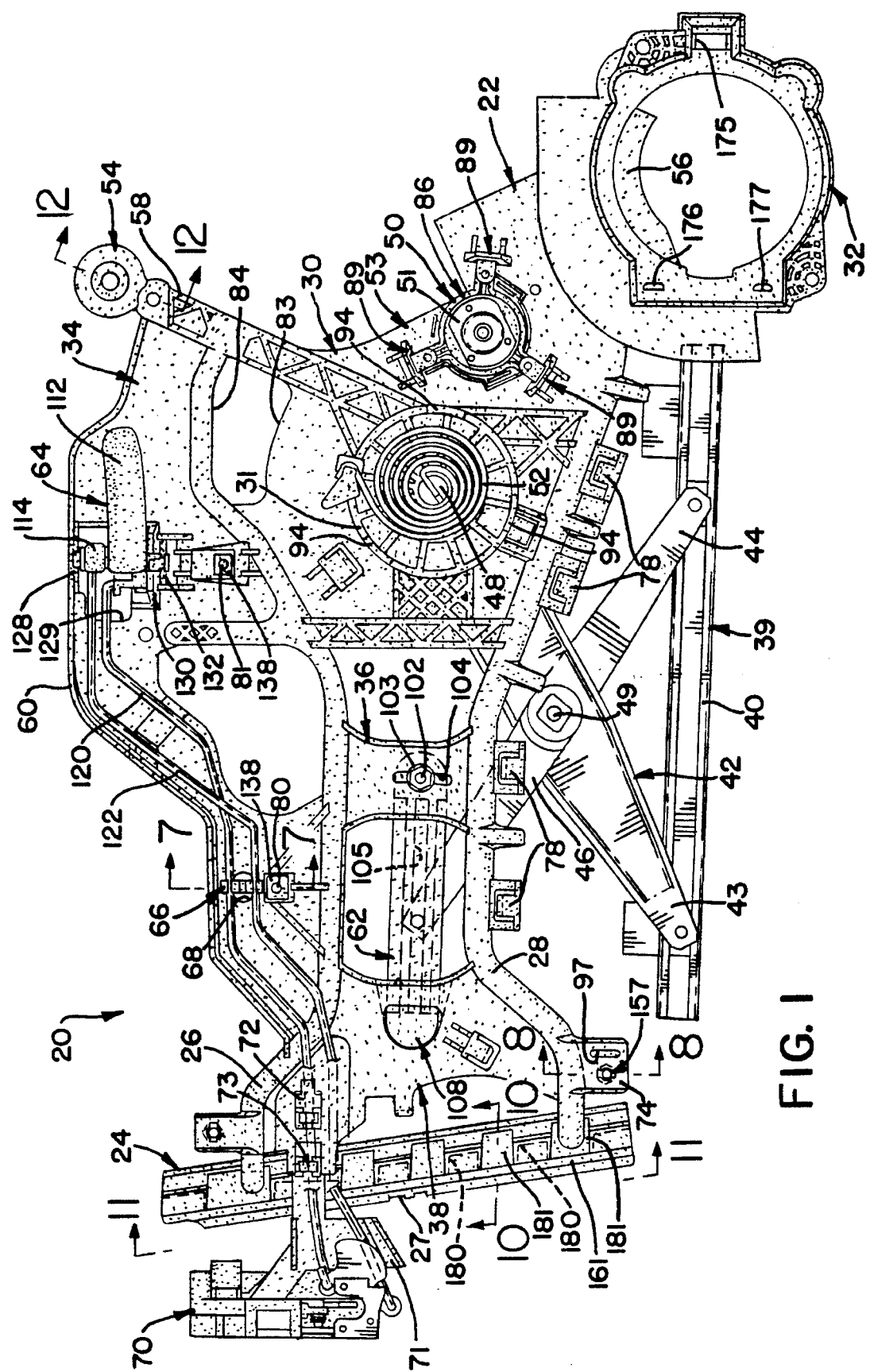
FIG. 1 is a side, elevation view of a door module having a one-piece molded plastic mounting frame.

Referring to FIG. 1, illustrated is a door module designated generally as 20. Door module 20 includes a one-piece molded plastic frame 22. Frame 22 has a network of integrally molded structural elements and hardware mounting surfaces. The structural elements include molded tube 26 and molded tube 28. The hardware mounting surfaces include window regulator mounting plate 30, latch actuator mounting plate 34, mounting plate 36 and mounting plate 38. A window guide channel 24 is integrally molded with the frame 22. Window guide channel 24 is positioned at the rear of the frame 22 and extends between molded tube 26 and molded tube 28 and also serves as a structural element.

Figure 8:
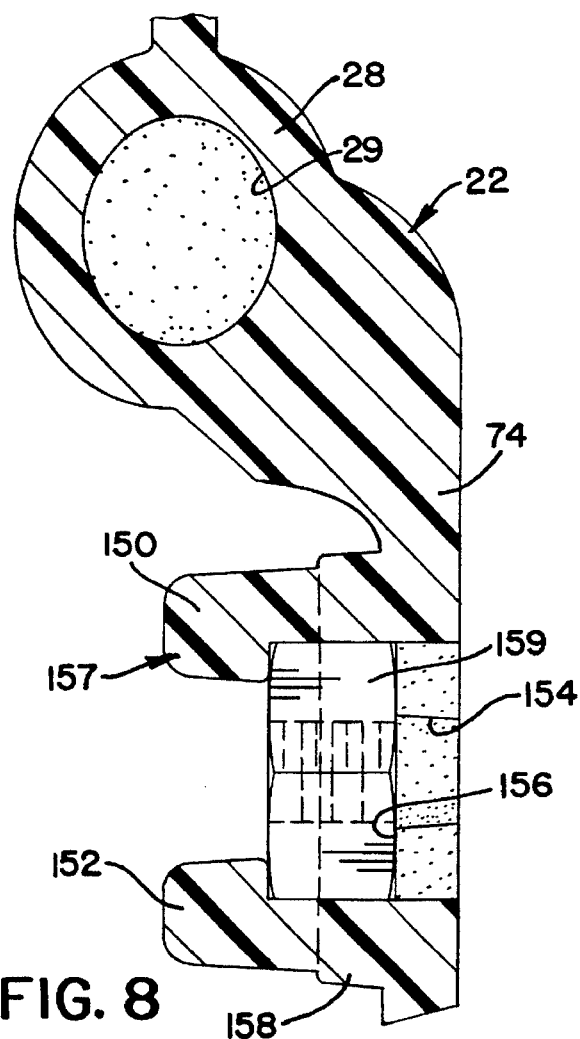
FIG. 8 is a sectional view taken generally through the plane indicated by the line 8—8 in FIG. 1.
Figure 10:
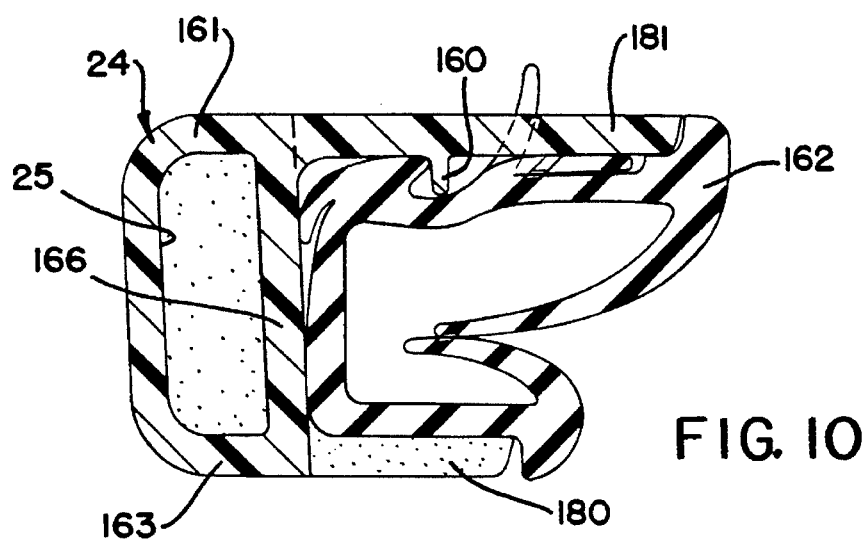
FIG. 10 is a sectional view taken generally through the plane indicated by the line 10—10 in FIG. 1.

The molded tube 28 is generally circular in cross section and includes a hollow interior 29 as illustrated in FIG. 8. Molded tube 26 comprises a similar construction. The window guide channel 24 is generally U-shaped in cross section as illustrated in FIG. 10. The U-shaped structure includes a hollow opening 25 which extends substantially along the length of the window guide channel 24. The hollow molded tubes 26 and 28 and the hollow window guide channel 24 are formed according to gas injection molding techniques as known in the art.

Figure 11:
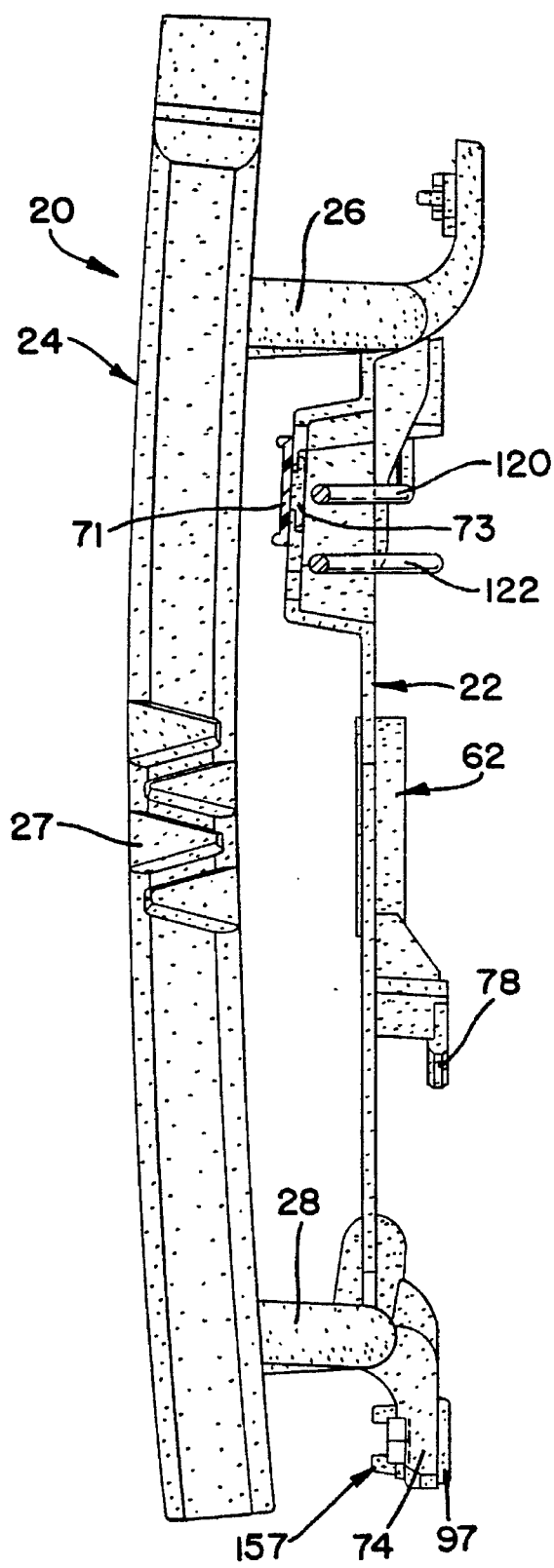
FIG. 11 is an end view taken generally in the direction of the line 11—11 as indicated in FIG. 1.

Illustrated in FIG. 11 is an end view of door module 20 illustrating a series of V-shaped plugs disposed along window guide channel 24 and forming core 27. Core 27 is optional and is preferably formed during the molding process by features of the die in which frame 22 is formed. During the gas injection phase of the molding process, gas is separately injected to flow along molded tube 26 and molded tube 28 into window guide channel 24. By interpositioning core 27 along window guide channel 24 the injected gas is maintained in two separate flow paths in forming the hollow opening 25. This forms a solid core at a preselected location at core 27 along window guide channel 24. Maintaining separate gas paths provides enhanced control of the injected gas in the molding process.

Referring to FIG. 1, a latch assembly 70 is attached to the frame 22 by means of latch carrier 71. Latch carrier 71 includes clips 72 and 73 for attaching to the frame 22. Latch carrier 71 permits the assembly of latch 70 to the module 20 prior to its assembly into a vehicle door (not illustrated). The clips 72 and 73 permit the latch 70 to float within a range of motion so that it is properly positionable when the module 20 is assembled into a door.

Positioned near the front of frame 22 is regulator mounting plate 30. Regulator mounting plate 30 includes a series of stiffening surface ribs 31 designed for mounting a window regulator lift mechanism thereabout. The window regulator lift mechanism is designated as window regulator assembly 39. At least one water deflector guard post 94 is integrally molded with frame 22 about ribs 31 to offset a water deflector (not illustrated), which is applied after module 20 is installed into a door. This maintains the water deflector in a position such that it does not become entangled in counterbalance spring 52.

Window regulator assembly 39 includes sash channel 40 which is adapted for mounting to a glass panel (not illustrated). A lift arm 42 includes an end 43 slidably mounted to the sash channel 40. Lift arm 42 is pivotally mounted to the module 20 by pivot stud 48. At its end opposite end 43, lift arm 42 includes a conventional stamped sector gear (not illustrated) for engaging a window regulator lift actuator 50. Counterbalance spring 52 is engaged by pivot stud 48 and applies a bias thereto to assist in pivoting lift arm 42 to lift sash channel 40.

Attached to lift arm 42 by stud 49 are arms 44 and 46. Arms 44 and 46 pivot about stud 49 in relation to lift arm 42. Arm 44 extends to and is slidably connected to sash channel 40. Arm 46 extends to and is slidably connected to adjustable cam channel 62. Adjustable cam channel 62 is connected to frame 22 at mounting plates 36 and 38.

Figure 4:
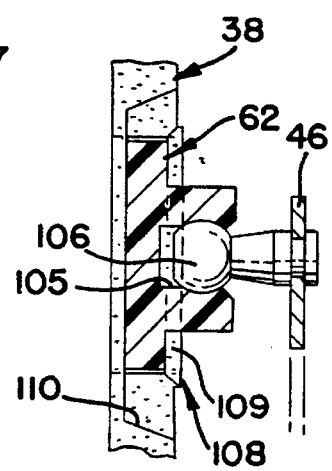
FIG. 4 is a sectional view taken generally through the plane indicated by the line 4—4 in FIG. 3.
Figure 3:
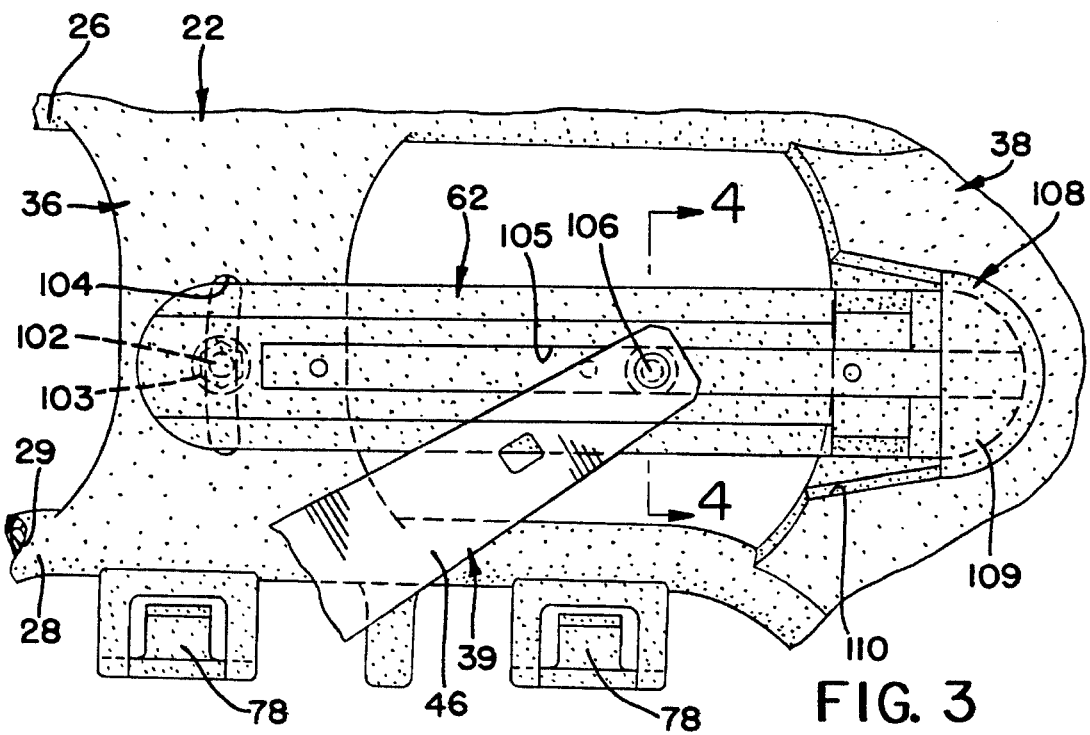
FIG. 3 is a fragmentary view of an adjustable cam channel feature

The engagement between adjustable cam channel 62 and frame 22 is better illustrated in FIGS. 3 and 4. Arm 46 includes ball stud 106 which directly slidably engages guide 105 of adjustable cam channel 62 and slides therealong. Integrally molded with frame 22 at mounting plate 38 is receptacle 108 which comprises a U-shaped cavity with wall 110, for pivotally receiving adjustable cam channel 62 and operates as a socket. Receptacle 108 includes integrally molded cap 109 to laterally retain adjustable cam channel 62 therein.

Adjustable cam channel 62 includes stud 102 which extends through frame 22 at slotted opening 104. A nut 103 is applied to the stud 102 on the interior side of mounting plate 36 to fixedly retain cam channel 62 in its adjusted position. By locating the nut 103 on the interior side of frame 22 suitable accessibility is provided when module 20 is mounted in a vehicle door.

Window regulator mounting plate 30 includes an integrally molded attachment feature 53 for mounting a window regulator lift actuator 50 thereon. The attachment feature 53 is adaptable to mounting either an electric motor actuator (not illustrated), or a manual actuator's clutch case assembly 51 thereto. Illustrated in FIG. 1 is manual actuator's clutch case assembly 51 as window regulator lift actuator 50.

Figure 2:
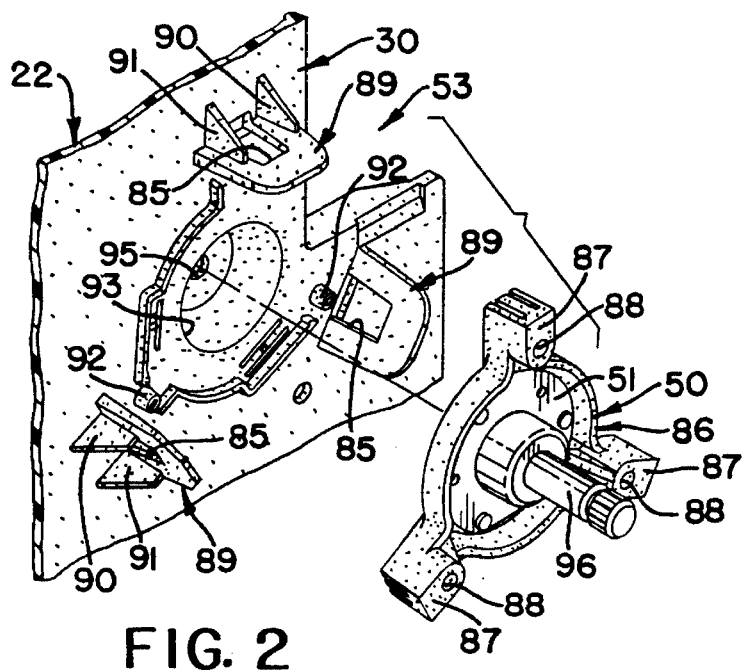
FIG. 2 is a fragmentary, perspective view of a manual clutch case mounting assembly.

The engagement between clutch case assembly 51 and frame 22 is better illustrated in FIG. 2. Window regulator mounting plate 30 includes cavity 93 formed therein. At the bottom of cavity 93 is a hole 95 through which the end of shaft 96 extends. Shaft 96 carries a pinion (not illustrated) in cavity 93 for engaging the sector gear on the end of lift arm 42. Window regulator mounting plate 30 includes a series of three clips 89, radially disposed around the cavity 93. Each clip 89 is backed by two overtravel limiting reinforcing ribs 90 and 91. A stud 92 extends from window regulator mounting plate 30 between each clip 89 and the cavity 93.

The manual actuator's clutch case assembly 51 is mounted to an adaptor 86. Adaptor 86 includes three legs 87 for snap-fitting engagement with openings 85 of each of the clips 89. Each leg 87 includes a hole 88 for positioning over studs 92. The adaptor 86 is adaptable to being attached to window regulator mounting plate 30 by means of ancillary fasteners (not illustrated) inserted through holes 88.

At the forward end of molded tube 28 and extending from window regulator mounting plate 30 is speaker mount 32. Speaker mount 32 is adapted for snap assembly of an audio speaker thereto through openings 175, 176 and 177. Speaker mount 32 includes water deflector 56 which is integrally molded therewith. Water deflector 56 extends from the exterior side of speaker mount 32 and operates to deflect water, which may enter the interior of the door assembly, away from the area of speaker mount 32.

Frame 22 includes opening 83 which forms a handle 84. Handle 84 is provided to assist in manual manipulation of the module 20. The handle is sized and positioned about molded tube 26, which has a rounded profile, to aid in manual grasping of the frame 22. When the assembled module 20 is lifted at handle 84 it is substantially balanced thereabout and does not tend to tip substantially toward either end.

Figure 5:
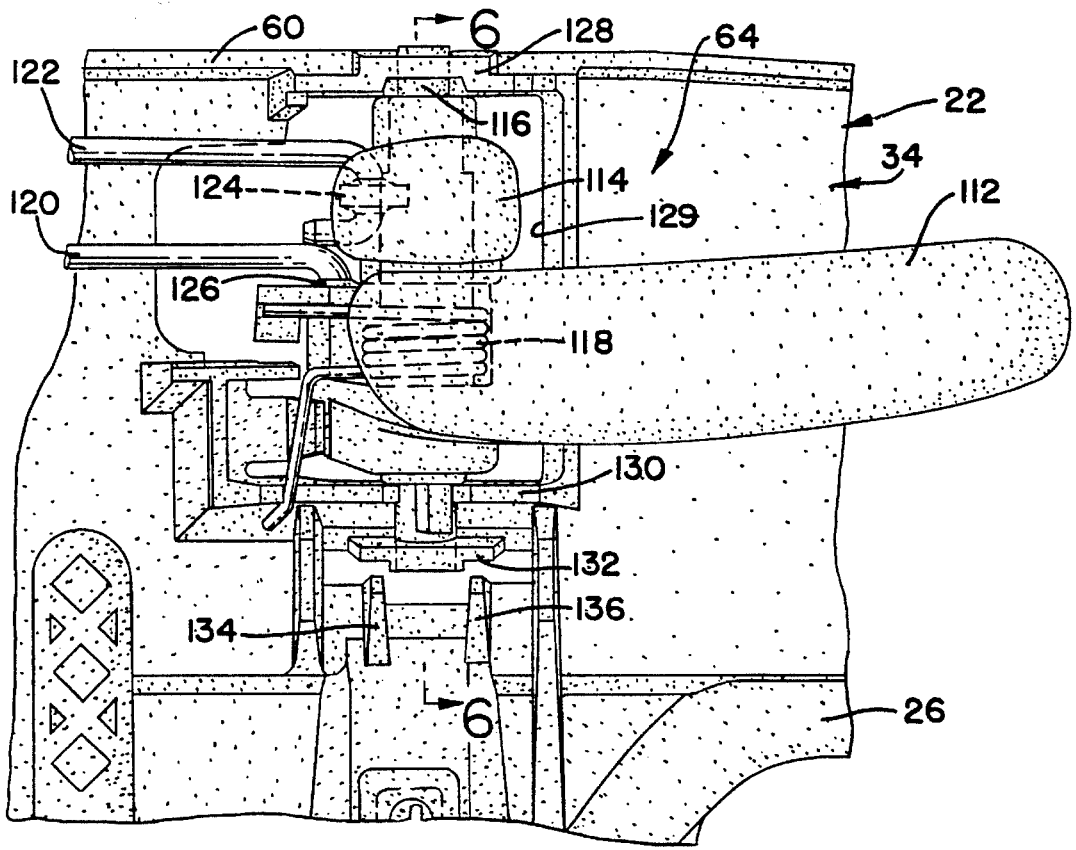
FIG. 5 is a fragmentary view of a handle and lock actuator mounting assembly.
Figure 6:
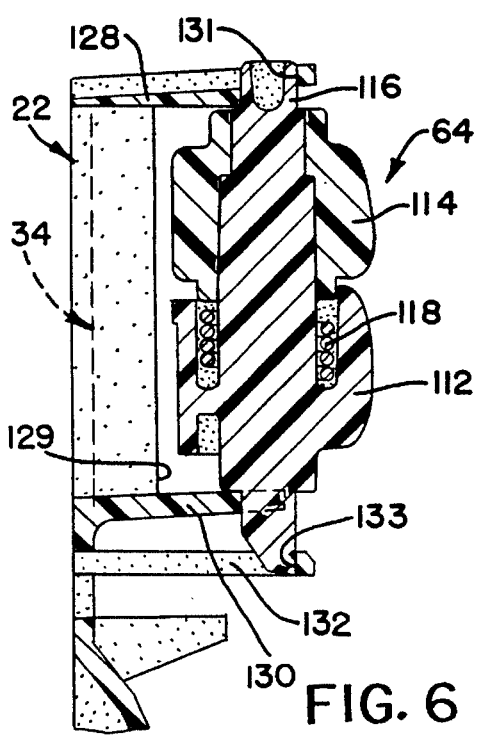
FIG. 6 is a sectional view taken generally through the plan indicated by the line 6—6 in FIG. 5.

Frame 22 includes integrally molded features for mounting a latch actuator assembly 64. The latch actuator assembly 64 includes a latch handle 112 and a lock handle 114 which are mounted on a common shaft 116 in a vertical relationship with one another and pivot about a common axis. The latch actuator assembly 64 is better illustrated in FIGS. 5 and 6.

Latch actuator mounting plate 34 includes integrally molded legs 128 and 132 extending from the inside thereof. This provides a means of snapping the latch actuator assembly 64 in place from the inboard side of module 20, thereby enhancing serviceability. Legs 128 and 132 are vertically opposed to one another across the opening 129. Leg 128 includes opening 131 extending vertically therethrough and leg 132 includes opening 133 extending vertically therethrough. Opening 131 and opening 133 are disposed along a common axis.

Door handle 112 and lock handle 114 are positioned on shaft 116 which in turn is carried in the openings 131 and 133. Door handle 112 includes spring 118 which biases door handle 112 forward and outboard, toward the latch actuator mounting plate 34. A clip 130 is integrally molded with frame 22 and releasably locks shaft 116 in position.

The shaft 116, latch handle 112 and lock handle 114 are mounted to module 20 by positioning shaft 116 through opening 131 and deflecting leg 132 downward to a position such that the opposite end of shaft 116 moves into opening 133. Ribs 134 and 136 are integrally molded with the frame 22 to prevent over deflection of leg 132. As shaft 116 is positioned within openings 131 and 133 clip 130 snaps onto shaft 116 thereby locking it in position.

Connected to latch handle 112 at clip 126 is latch rod 120. Connected to lock handle 114 at clip 124 is lock rod 122. As illustrated in FIG. 1, latch rod 120 and lock rod 122 are routed across latch actuator mounting plate 34, past molded tube 26, across mounting plate 38 and attached to latch assembly 70. A rod guide 66 is positioned in opening 68 of frame 22 and attaches to latch rod 120 and lock rod 122 to supply support thereto. Opening 68 serves as a mount for rod guide 66. The rod guide 66 is serviceable in-that it can be removed from the opening 68 from the interior side of frame 22 without removing module 20 from the vehicle's door and be replaced.

Figure 7:
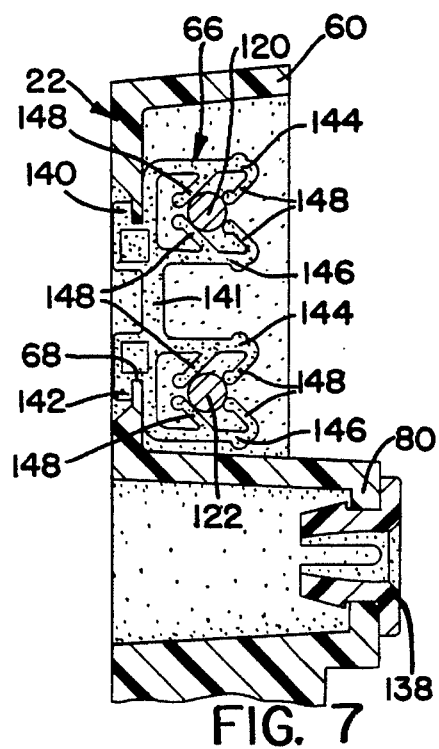
FIG. 7 is a sectional view taken generally through the plane indicated by the line 7—7 in FIG. 1.

The engagement between rod guide 66 and opening 68 is better illustrated in FIG. 7. Rod guide 66 includes base 141 from which legs 140 and 142 extend. Opening 68 provides a keyed engagement with rod guide 66. Opening 68 is larger in the horizontal direction than in the vertical direction. Rod guide 66 is attached to frame 22 by orienting it in a horizontally disposed position and inserting it into opening 68. Rod guide 66 is secured in opening 68 by twisting it to a vertically disposed position such that the portion of frame 22 around opening 68 is captured between the legs 140 and 142 and the base 141.

Extending from base 141 are two integral clips, one for capturing latch rod 120 and another for capturing lock rod 122. Each clip is comprised of two arms 144 and 146, each of which includes a pair of fingers 148 forming a receptive nest into which the respective rod is snapped. Once a rod is captured between the fingers 148 it is releasably held in the cross-car position while permitted to slide through the clip in the fore/aft direction.

Rod guide 66 is designed to maintain latch rod 120 and lock rod 122 in a position close to frame 22 underneath flange 60. Flange 60 is provided along the top of latch actuator mounting plate 34. Flange 60 is designed to inhibit the use of a tool inserted through the door's belt line (not illustrated) to capture lock rod 122 and thereby unlock latch assembly 70. Flange 60 thereby inhibits the unconventional unlocking of latch assembly 70.

Also illustrated in FIG. 7 and disposed directly below rod guide 66 is a reinforced attachment feature 80. As illustrated in FIG. 1, two such attachment features 80 and 81 are provided on frame 22. Reinforced attachment features 80 and 81 each carry a snap-in plastic nut 138 for mounting an interior door armrest (not illustrated), or pull handle (not illustrated), to frame 22. The plastic nuts 138 are disposed close to the plane of frame 22 to reduce the effects of cantilevered loads placed on the armrest or handle.

Referring to FIG. 10, a cross-sectional view of window guide channel 24 through tab 181 is shown. Window guide channel 24 is defined by wall 166 and walls 161 and 163. Referring additionally to FIG. 1, wall 161 includes a series of vertically spaced apart tabs 181. Wall 163 is defined by a series of vertically spaced apart tabs 180. The wall 161 includes a series of integrally molded ribs 160 which provide a grip feature in the U-shaped cross section and function to retain a seal 162.

As illustrated in FIG. 1, frame 22 includes a plurality of integrally molded mounting legs 74. FIG. 8 illustrates in cross section a view of leg 74 extending from molded tube 28. The leg 74 provides a means of attaching module 20 to a vehicle door. Carried by the leg 74 is a nut 159 through which a threaded fastener (not illustrated), is inserted to attach the module to a door.

Figure 9:
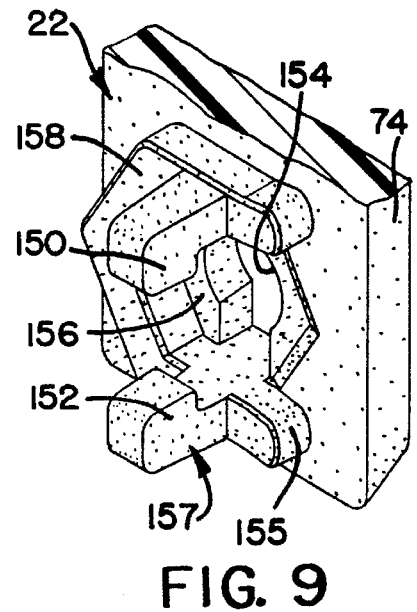
FIG. 9 is a fragmentary, perspective view of a snap-fit nut holder.

Referring to FIG. 9 along with FIG. 8, a nut holder 157 is illustrated. Nut holder 157 includes a cavity 154 formed in leg 74. A wall 158 substantially surrounds the cavity 154 and exhibits an opening 155 on one side. Two opposed L-shaped legs 150 and 152 extend from wall 158 and are oriented to retain the nut 159 in cavity 154. A stop 156 is formed in the cavity 154 to prevent nut 159 from passing through.

As illustrated in FIG. 1, leg 74 includes two-way locator 97. Two-way locator 97 comprises a flatten pin which mates with an opening in a door panel (not illustrated) to locate the module 20.

Figure 12:
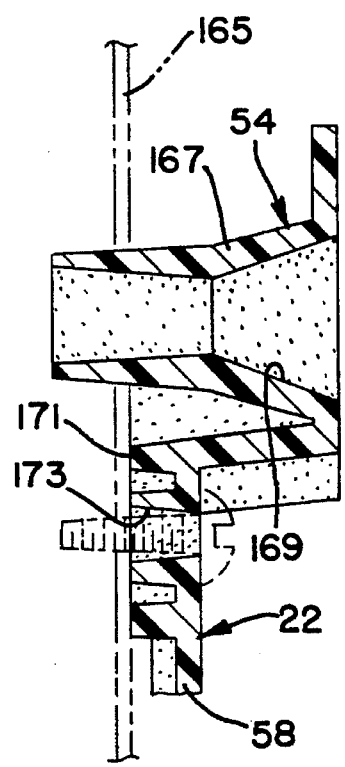
FIG. 12 is a sectional view taken generally through the plane indicated by the line 12—12 in FIG. 1.

Extending along the top forward area of frame 22 is a reinforced arm 58. Arm 58 carries at its end a four-way locator 54. Four-way locator 54 is better illustrated in FIG. 12.

Four-way locator 54 includes a tapered pin 167 which is inserted through a vehicle door panel 165 to correctly position door module 20 in a vehicle door. The four-way locator 54 thus provides a means to generate a geometric dimensioning and tolerancing datum scheme, through which a mechanism is provided for establishing proper positioning of the various hardware components that are mounted on the frame 22. Four-way locator 54 also includes tapered hole 169 which provides a four-way locator for an interior door trim panel (not illustrated) which is assembled over the interior side of module 20 after its assembly in a vehicle door. The four-way locator 54 also includes a stop 171 to ensure a maximum outboard position is not exceeded in properly positioning frame 22 in the cross-car direction. An opening 173 is provided at the top of arm 58 to fix the location of frame 22 after the four-way locator 54 has properly positioned it.

Frame 22 also includes a series of clips 78 shown disposed along molded tube 28. Clips 78 provide a connecting feature for a vehicle wire harness (not illustrated) which is added to the module to provide power to such items as a speaker (not illustrated) and an electric window regulator actuator (not illustrated).

What is claimed is:

1. A door module comprising:
   a one piece plastic frame having a network of integrally molded structural elements, hardware mounting surfaces and a handle having a rounded gripping surface positioned such that the door module is substantially balanced about the handle.

2. A door module according claim 1 further comprising:
   a cam channel receptacle integrally molded with the one piece plastic frame including a pivot socket.

3. A door module comprising:
   a one piece plastic frame having a network of integrally molded structural elements and hardware mounting surfaces; and
   a speaker mount integrally molded with the one piece plastic frame including an integrally molded water deflector.

4. A door module comprising:

a one piece plastic frame having a network of integrally molded structural elements and hardware mounting surfaces; and a clip assembly including vertically opposed first and second legs the first and second legs each having an opening therethrough for mounting both a latch handle and a lock handle on a common pivot axis which extends through the openings of the first and second legs.

5. A door module comprising:

a one piece plastic frame having a network of integrally molded structural elements and hardware mounting surfaces; and a window guide channel integrally molded with the one piece plastic frame including a generally U-shaped cross section having first and second walls and a third curved wall wherein the first wall includes a series of integrally molded ribs providing a grip feature in the U-shaped cross section.

6. A door module comprising:

a one piece plastic frame having a network of integrally molded structural elements and hardware mounting surfaces;

a flange integrally molded with the one piece plastic frame; and an integrally molded rod guide clip mount positioned adjacent and below the flange.

7. A door module comprising:

a one piece plastic frame having a network of integrally molded structural elements and hardware mounting surfaces; and a window regulator mounting plate integrally molded with the one piece plastic frame having a series of stiffening ribs with at least one water deflector guard post extending therefrom.

8. A door module comprising;

a one piece plastic frame having a network of integrally molded structural elements and hardware mounting surfaces; and an integrally molded nut holder including a cavity, a wall surrounding the cavity with an opening and two opposed L-shaped legs extending from the wall.

9. A door module comprising;

a one piece plastic frame having a network of integrally molded structural elements and hardware mounting surfaces; and a window guide channel integrally molded with the one piece plastic frame including a hollow interior and a core closing the hollow interior and positioned along the window guide channel.

10. A door module comprising;

a one piece plastic frame having a network of integrally molded structural elements and hardware mounting surfaces; and a four way locator integrally molded with the one piece plastic frame including a tapered pin and a tapered hole concentrically disposed with the tapered pin.

11. A door module comprising:

a one piece plastic frame having a network of integrally molded structural elements, hardware mounting surfaces and a handle having a rounded gripping surface positioned such that the door module is substantially balanced about the handle;

a cam channel receptacle integrally molded with the one piece plastic frame including a pivot socket;

a speaker mount integrally molded with the one piece plastic frame including an integrally molded water deflector;

a handle clip assembly including vertically opposed first and second legs the first and second legs each having a shaft opening therethrough for mounting both a latch handle and a lock handle on a common pivot axis which extends through the shaft openings;

a window guide channel integrally molded with the one piece plastic frame including a generally U-shaped cross section having first and second walls and a third curved wall wherein the first wall includes a series of integrally molded ribs providing a grip feature in the U-shaped cross section and including a hollow interior and a core closing the hollow interior and positioned along the window guide channel;

a flange integrally molded with the one piece plastic frame;

an integrally molded rod guide clip mount positioned adjacent and below the flange;

a window regulator mounting plate integrally molded with the one piece plastic frame having a series of stiffening ribs with at least one water deflector guard post extending therefrom;

an integrally molded nut holder including a nut cavity, a fourth wall surrounding the nut cavity with a nut opening and two opposed L-shaped legs extending from the fourth wall; and a four way locator integrally molded with the one piece plastic frame including a tapered pin and a tapered hole concentrically disposed with the tapered pin.

* * * * *